F. HOHORST.
Slings for Raising Animals.
No. 136,059. Patented Feb. 18, 1873.
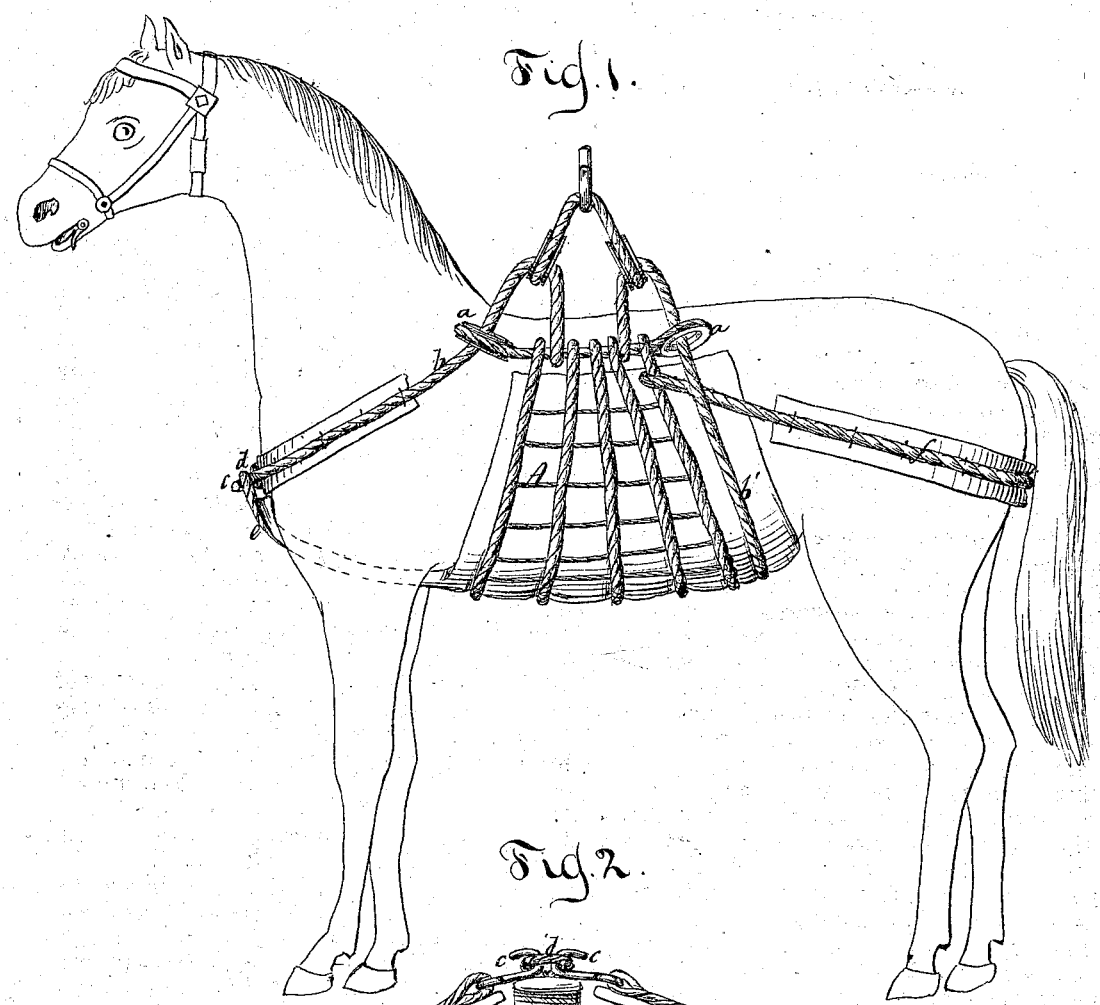
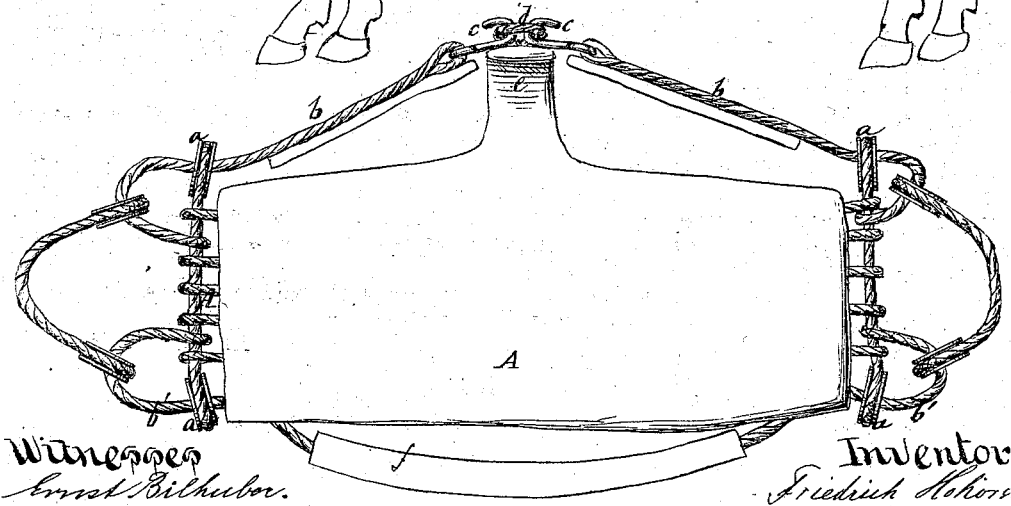

UNITED STATES PATENT OFFICE.

FRIEDRICH HOHORST, OF NEW YORK, N. Y.

IMPROVEMENT IN SLINGS FOR RAISING ANIMALS.

Specification forming part of Letters Patent No. 136,059, dated February 18, 1873.

*To all whom it may concern:*

Be it known that I, FRIEDRICH HOHORST, of the city, county, and State of New York, have invented a new and Improved Sling for Raising and Moving Animals and other bodies; and I do hereby declare the following to be a full, clear, and exact description thereof, which will enable those skilled in the art to make and use the same, reference being had to the accompanying drawing forming part of this specification, in which drawing—

Figure 1 represents a side view of my sling as applied to a horse. Fig. 2 is a plan or top view of the same when spread out.

Similar letters indicate corresponding parts.

This invention relates to an improvement on that class of slings which I have described in my patent No. 119,765, dated October 10, 1871. My present improvement consists in combining with the body of the sling a central extension and a sectional side rope extending from said extension through corner eyelets to the ends of the body in such a manner that by said extension and the sectional side rope, the application of my sling to the body of a horse or other animal is materially facilitated; also, in the arrangement of an additional safety-strap on the side of the sling, and beyond its side rope, for the purpose of fastening the sling in position on the body of an animal with increased security; further, in combining with the netting, which forms the body of my sling, a cushion to ease the pressure of the sling when the same is applied to the body of an animal.

In the drawing, the letter A designates a netting, made of ropes or thick cords in an oblong or rectangular form. To each of the four corners of this rope-netting is secured an eyelet or grommet, *a*, and through these grommets pass the protecting side ropes *b b'*, which are fastened at their ends to the ends of the netting near said grommets, and one of which is fastened in the middle to the sides of the netting, as described in my patent No. 119,765. The side rope *b* is made in sections, and each of these sections is provided at its end with a hook, *c*, to catch in a loop, *d*, at the outer end of an extension, *e*, which projects from the side of the body A, as shown in Fig. 2. On the opposite side of the body A I have applied a safety-strap, *f*, one end of which is loose and arranged so that it can be secured to the body A. The body A is lined with a cushion, and the sections of the side rope *b* and the safety-straps *f* are also protected by cushions.

In applying my sling to the body of a horse or other animal, I place the same round the belly of the animal; then I draw the extension *e* through between the front legs and attach to it the sectional side rope *b*; and finally I carry the safety-strap *f* round the rear of the animal, and secure its loose end to the body of the sling. After the sling has been thus secured in position, I attach it to a hoisting-rope, as indicated in Fig. 1, and the animal can be raised into a vessel, or from a lower to the upper story of a building, or it can be suspended in the air without difficulty.

I do not claim suspending an animal by means of a blanket which passes around the body of the same, and carries at its ends rigid bars provided with ropes which connect with a hoisting-tackle, for such is not my invention.

What I claim as new, and desire to secure by Letters Patent, is—

The combination, in a sling A, of the side ropes *b b'*, extension *e*, and grommets or eyes *a a*, with or without the safety-strap *f*, substantially as and for the purpose herein specified.

This specification signed by me this 15th day of October, 1872.

FR. HOHORST.

Witnesses:
W. HAUFF,
E. F. KASTENHUBER.